US006910633B2

(12) United States Patent
Swartz et al.

(10) Patent No.: US 6,910,633 B2
(45) Date of Patent: *Jun. 28, 2005

(54) PORTABLE INSTRUMENT FOR ELECTRO-OPTICALLY READING INDICIA AND FOR PROJECTING A BIT-MAPPED COLOR IMAGE

(75) Inventors: Jerome Swartz, Old Field, NY (US); Chinh Tan, Setauket, NY (US); Duanfeng He, Farmingville, NY (US); Eugene Joseph, Coram, NY (US); Joseph Katz, Stoney Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/682,345

(22) Filed: Oct. 9, 2003

(65) Prior Publication Data

US 2004/0074971 A1 Apr. 22, 2004

Related U.S. Application Data

(63) Continuation of application No. 09/604,197, filed on Jun. 27, 2000, now Pat. No. 6,655,597.

(51) Int. Cl.⁷ .............................................. G08K 7/10
(52) U.S. Cl. .......................... 235/472.01; 235/462.45
(58) Field of Search ................... 235/462.45, 472.01, 235/462.36, 462.38, 462.48, 462.49, 469, 472.03; 348/67–70, 108, 203; 359/443, 460

(56) References Cited

U.S. PATENT DOCUMENTS

| 5,506,394 A | * | 4/1996 | Plesko ................... 235/462.46 |
| 5,600,121 A | * | 2/1997 | Kahn et al. ............ 235/462.48 |
| 6,119,944 A | * | 9/2000 | Mulla et al. ............ 235/472.03 |
| 6,655,597 B1 | * | 12/2003 | Swartz et al. .......... 235/462.45 |

FOREIGN PATENT DOCUMENTS

JP   05094556 A  *  4/1993   ............ G06K/1/12

OTHER PUBLICATIONS

Paul M. Hagelin, Optical Raster Scanning Display Based on Surface–Micromachined Polysilicon Mirrors, Jan./Feb. 1999, IEEE Journal of selected topics in Quantum Electronics, vol. 5, No. 1, pp. 67–74□□.*

Kajik Yoshihiro, Autostereoscopic 3–D Video Display Using Multiple Light Beams with Scanning, Mar. 2000, IEEE Transactions on circuits and System for Video Tech., vol. 10, No. 2.*

* cited by examiner

Primary Examiner—Diane I. Lee
(74) Attorney, Agent, or Firm—Kirschstein et al.

(57) ABSTRACT

A portable instrument incorporates an electro-optical assembly for reading indicia during a reading mode, and for projecting a bit-mapped color image during a display mode. A manually operable switch on the instrument is disposed for selecting one of the modes. The color image is formed by pulsing a plurality of differently colored lasers at selected times on selected scan lines.

12 Claims, 13 Drawing Sheets

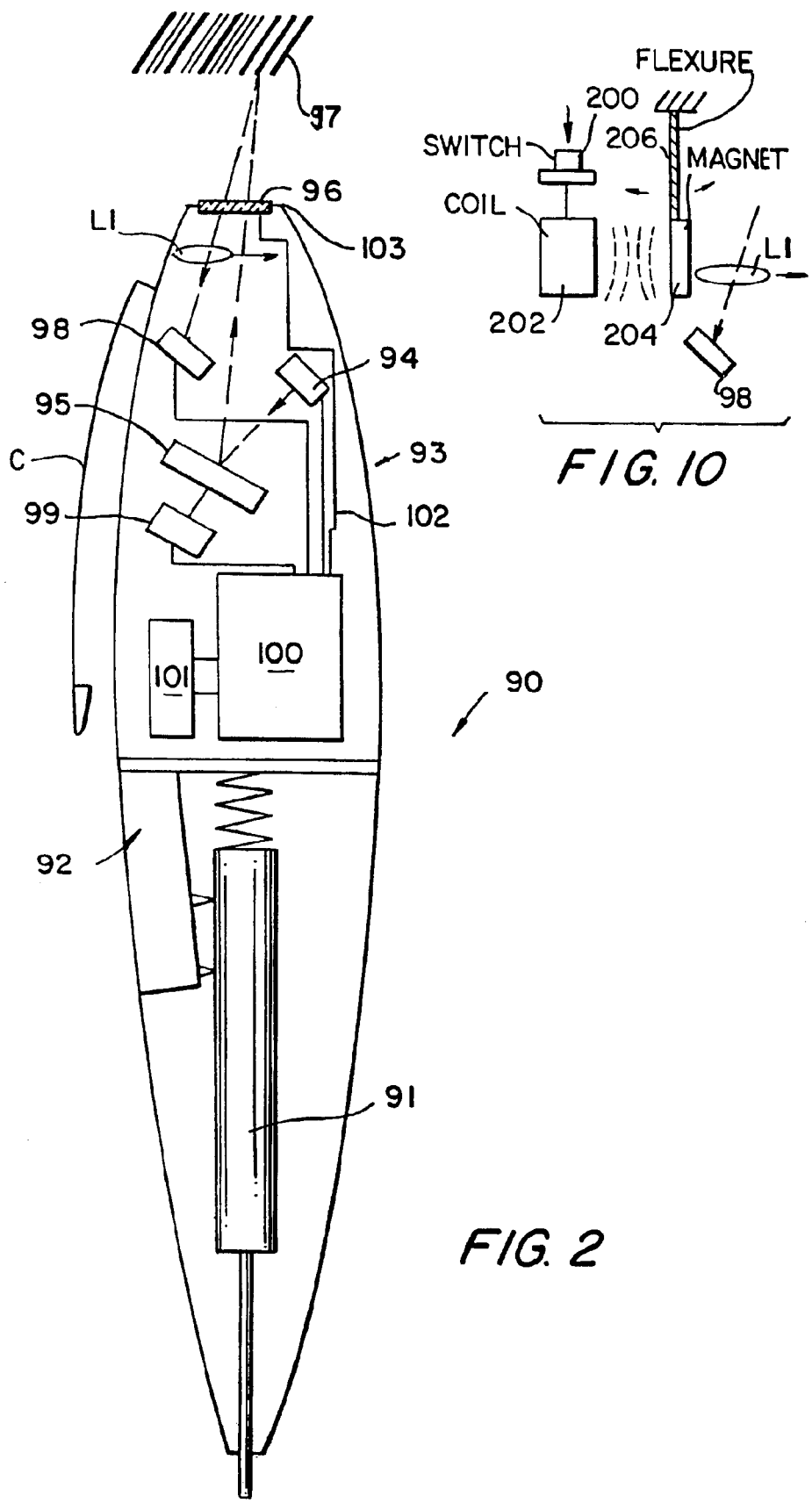

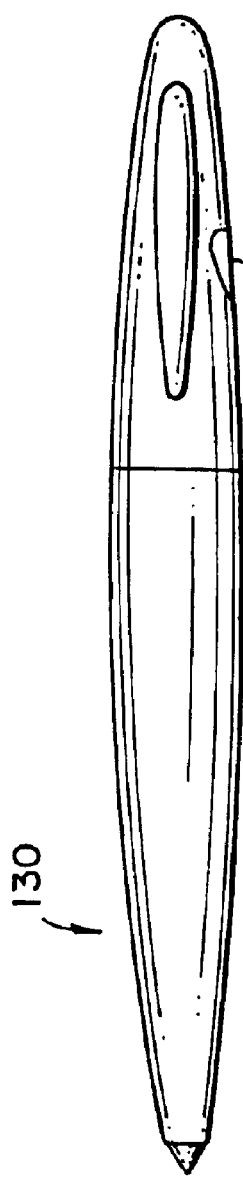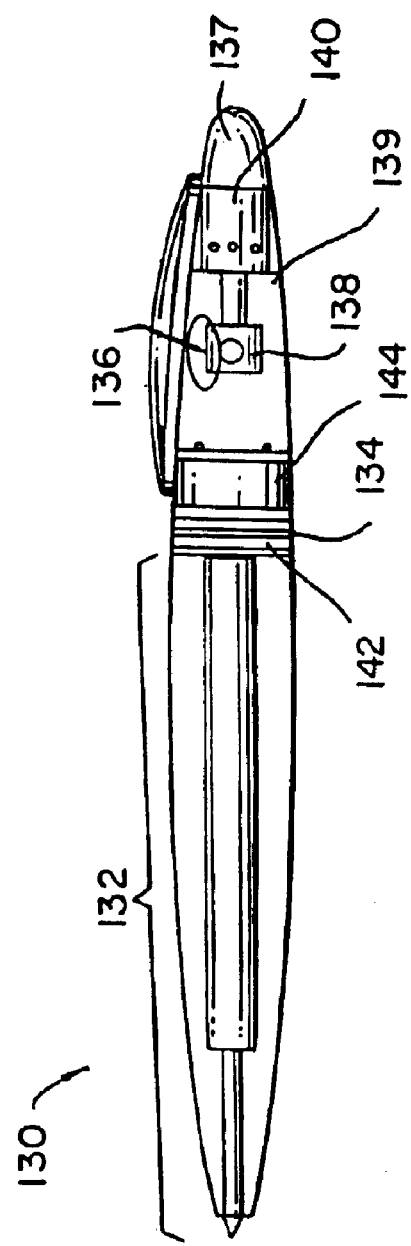

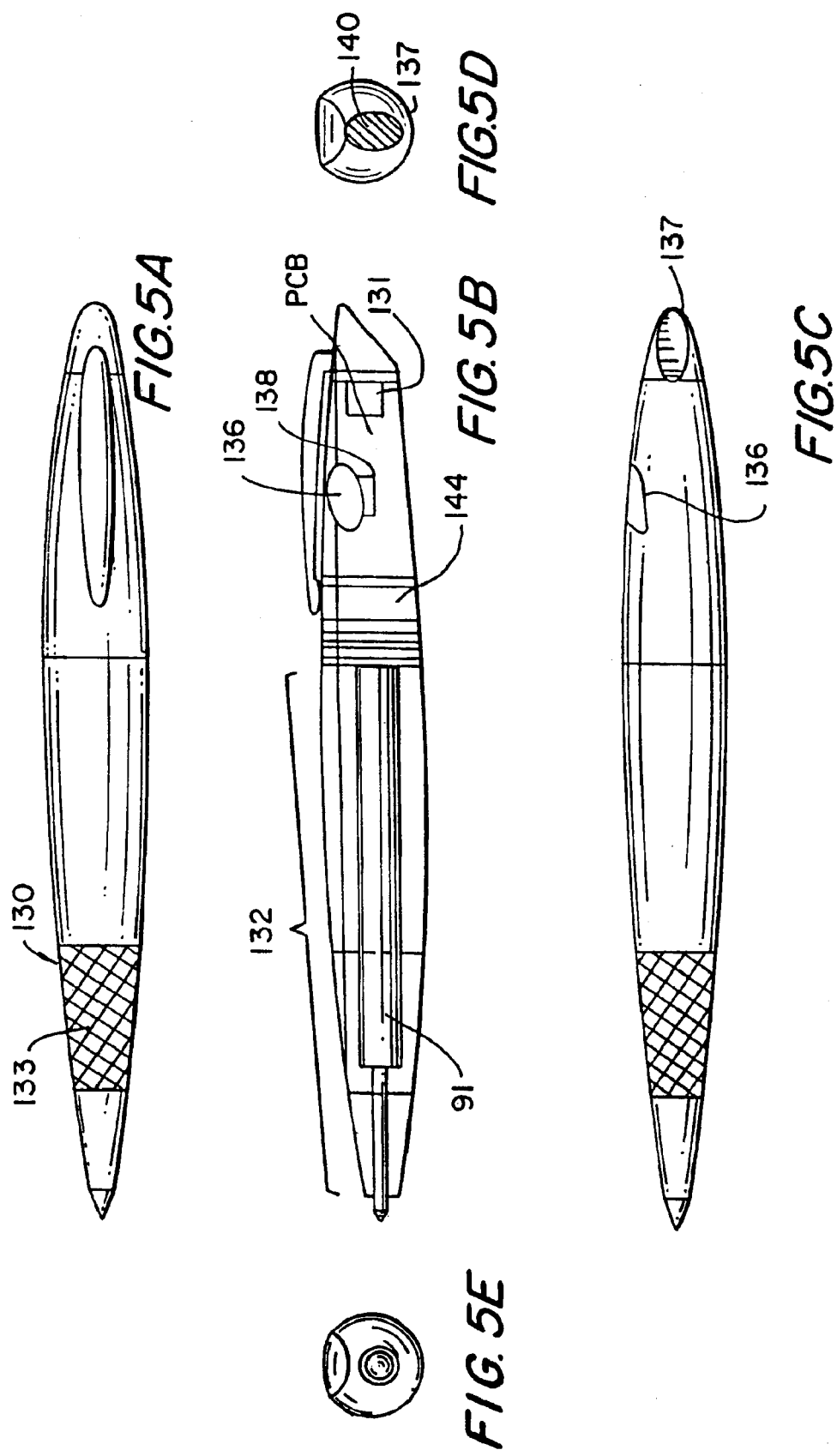

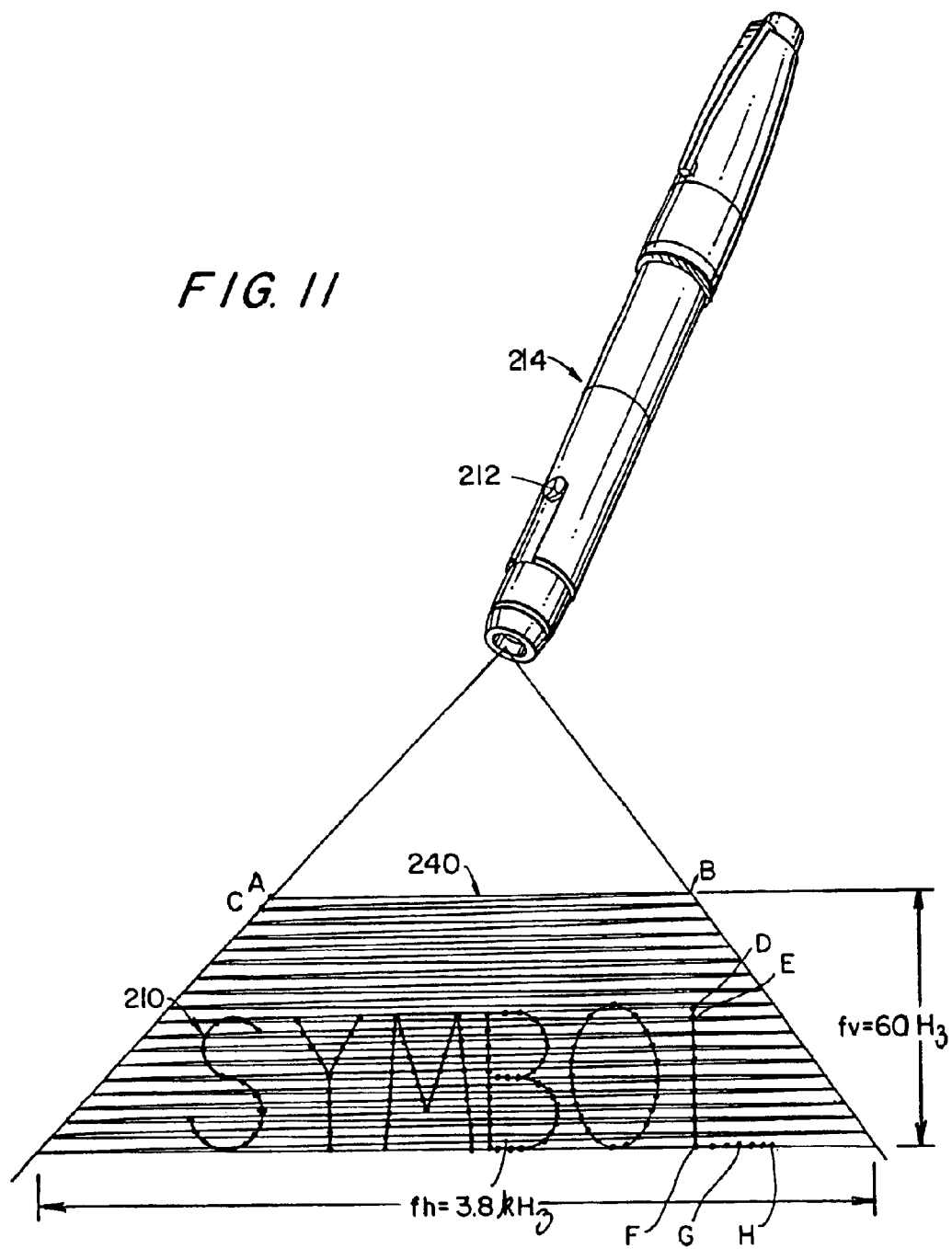

PORTABLE INSTRUMENT FOR ELECTRO-OPTICALLY READING INDICIA AND FOR PROJECTING A BIT-MAPPED COLOR IMAGE

This application is a continuation of U.S. patent application Ser. 09/604,197, filed Jun. 27, 2000, now U.S. Pat. No. 6,655,597.

BACKGROUND OF THE INVENTION

1. Field of the Invention

The present invention generally relates to a portable instrument for electro-optically reading colored indicia, such as a bar code symbol, a signature, or an object image of any object, and for selectively projecting a bit-mapped display colored image on a viewing surface.

2. Description of the Related Art

Various optical scanning systems and readers have been developed heretofore for reading indicia such as bar code symbols appearing on a label or on the surface of an article. The bar code symbol itself is a pattern of graphic indicia comprised of a series of bars of various widths spaced apart from one another to bound spaces of various widths, the bars and spaces having different light reflecting characteristics. The readers function by electro-optically transforming the spatial pattern represented by the graphic indicia into a time-varying electrical signal, which is, in turn, decoded into data which represent the information or characters encoded in the indicia that are intended to be descriptive of the article or some characteristic thereof. Such data is typically represented in digital form and utilized as an input to a data processing system for applications in point-of-sale processing, inventory control, distribution, transportation and logistics, and the like.

A variety of scanning devices is known. The scanner could be a wand type reader, such as shown in U.S. Pat. No. 5,508,504, herein incorporated by reference, including an emitter and a detector fixedly mounted in the wand, in which case the user manually moves the wand across the symbol. As the wand passes over the bar code symbol, the emitter and associated optics produce a light spot which impacts on the symbol, and the detector senses the light reflected back from the light spot passing over each symbol. Alternatively, an optical moving spot scanner scans a light beam, such as a laser beam, across the symbol; and a detector senses reflected light from the beam spot scanned across the symbol. In each case, the detector produces an analog scan signal representing the encoded information.

Moving spot scanners of this general type have been disclosed for example, in U.S. Pat. No. 4,387,297; U.S. Pat. No. 4,409,470; U.S. Pat. No. 4,760,248; U.S. Pat. No. 4,896,026; U.S. Pat. No. 5,015,833; U.S. Pat. No. 5,262,627; U.S. Pat. No. 5,504,316 and U.S. Pat. No. 5,625,483, all of which have been assigned to the same assignee as the instant application and each of which is hereby incorporated by reference. As disclosed in some of the above patents, one embodiment of such a scanning system resides, inter alia, in a hand held, portable laser scanning device supported by a user, which is configured to allow the user to aim the scanning head of the device, and more particularly, a light beam, at a targeted symbol to be read.

The light source in a laser scanner bar code reader is typically a semiconductor laser. The use of semiconductor devices as the light source is especially desirable because of their small size, low cost and low voltage requirements. The laser beam is optically modified, typically by an optical assembly, to form a beam spot of a certain size at the target distance. It is often preferred that the cross section of the beam spot measured in the scanning direction at the target distance be approximately the same as the minimum width in the scanning direction between regions of different light reflectivity, i.e., the bars and spaces of the symbol. Although typical readers utilize a single laser source, other bar code readers have been proposed with two or more light sources of different characteristics, e.g., different frequencies.

In the laser beam scanning systems known in the art, a single laser light beam is directed by a lens or other optical components along the light path toward that includes a bar code symbol on the surface. The moving-beam scanner operates by repetitively scanning the light beam in a line or series of lines across the symbol by means of motion of a scanning component, such as the light source itself or a mirror disposed in the path of the light beam. The scanning component may either sweep the beam spot across the symbol and trace a scan line across the pattern of the symbol, or scan a field of view of a photodetector, or do both. The laser beam may be moved by optical or opto-mechanical means to produce a scanning light beam. Such action may be performed by either deflecting the beam (such as by a moving optical element, such as a mirror) or moving the light source itself. U.S. Pat. No. 5,486,944 describes a scanning module in which a mirror is mounted on a flex element for reciprocal oscillation by electromagnetic actuation. U.S. Pat. No. 5,144,120 to Krichever, et al., describes laser, optical and sensor components mounted on a drive for repetitive reciprocating motion either about an axis or in a plane to effect scanning of the laser beam.

Because of the size and optical and electronic complexity of scanning systems and bar code readers, they generally have heretofore not been combined with other devices in the same housing. The conventional use of a liquid crystal display (LCD) on such readers occupies a large viewing area and limits any proposed reduction in size for a handheld system. The display image is displayed in a single color.

Also known is a laser pointer which is a device that projects a monochromatic spot of light on a target, such as a presentation being made by a lecturer to an audience. The pointer is essentially a flashlight-type device and is usually packaged in a tubular housing.

SUMMARY OF THE INVENTION

Objects of the Invention

Accordingly, it is a general object of this invention to provide a colored image projector and a bar code reader in the same housing.

More particularly, it is an object of the present invention to provide a manual switch on an instrument to change the instrument between a display mode and a reading mode.

It is yet another object of the present invention to provide a colored image projector and a bar code reader in a pen-shaped battery-operated housing that is able to acquire and store data from bar code symbols, and subsequently download such data to a computer; the bar code reader may be operated either as a wand, in which the bar code symbol, located a few inches from the end of the housing, is manually scanned by the user, or as a self-scanning unit using a mirror to scan the laser beam across the bar code symbol.

A still further object of the present invention is to provide a portable computer that can optionally be used as a colored image projector or as a bar code reader.

FEATURES OF THE INVENTION

In keeping with the above objects and others which will become apparent hereafter, one feature of the present invention provides a combined colored image projector and scanner for scanning colored indicia, including a portable, hand-held housing aimable by a user at a target; an electro-optical assembly supported by the housing, for reading the indicia during a reading mode, and for projecting a bit-mapped colored image on a viewing surface during a display mode; and a mode selector for selecting one of the modes.

The assembly advantageously includes a plurality of lasers each operative for emitting a laser beam of a different color, either by emitting laser beams at different frequencies or by passing a respective beam through different color filters. For example, red, blue and green colored beams can be focused and aimed at the viewing surface to form a spot of a desired color. The spot is then scanned in mutually orthogonal directions and is pulsed on and off to form the bit-mapped colored image.

Conversely, the assembly may include a plurality of photodetectors each having a differently colored filter, and operative for receiving differently colored reflections of light from a colored image to enable the assembly to capture the colored image.

In one preferred embodiment, an optical element in the housing is mechanically moved in and out of the path of each emitted laser beam during the reading mode to focus the laser beams at either a short range from the housing (for bar code reading) or at a substantially greater range (for bar code reading). In the reading mode, each detector is activated for detecting at least a portion of light of variable intensity reflected off the coded indicia and for generating an electrical signal indicative of the detected light intensity. In the display mode, the movable element is also moved to focus the bit-mapped image at different distances relative to the housing.

The housing also includes a processor for decoding the electrical signal into data represented by the coded indicia, a memory for storing the data within the housing, and a download interface for downloading the stored data to a remote host for further processing.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows the principal components of a pen-type optical reader;

FIG. 4A shows an alternative version of the pen-type optical reader;

FIG. 4B shows in more detail the principal components of the pen-type optical reader shown in FIG. 4A;

FIG. 5A shows a further alternative pen-type optical reader;

FIG. 5B shows in more detail the principal components of the pen-type optical reader of FIG. 5A;

FIG. 5C is a view of the pen-type optical reader of FIG. 5A from a different angle;

FIG. 5D is an end view of the reader of FIG. 5B;

FIG. 5E is an opposite end view of the reader of FIG. 5B;

FIG. 10 is a schematic view of a drive for moving the focusing lens;

FIG. 11 is a perspective view of a portable instrument during a display mode of operation;

DETAILED DESCRIPTION OF THE PREFERRED EMBODIMENTS

As used in this specification and in the appended claims, the term "indicia" broadly encompasses not only symbol patterns composed of alternating bars and spaces of various widths commonly referred to as bar code symbols, but also one or two dimensional graphic patterns, such as signatures as well as alphanumeric characters. In general, the term "indicia" may apply to any type of pattern or information which may be recognized or identified by scanning a light beam and/or a field of view of a photodetector, and detecting reflected or scattered light as a representation of variations in light reflectivity at various points of the pattern or information. A bar code symbol is one example of an "indicia" which the present invention can scan.

Figure 1A:
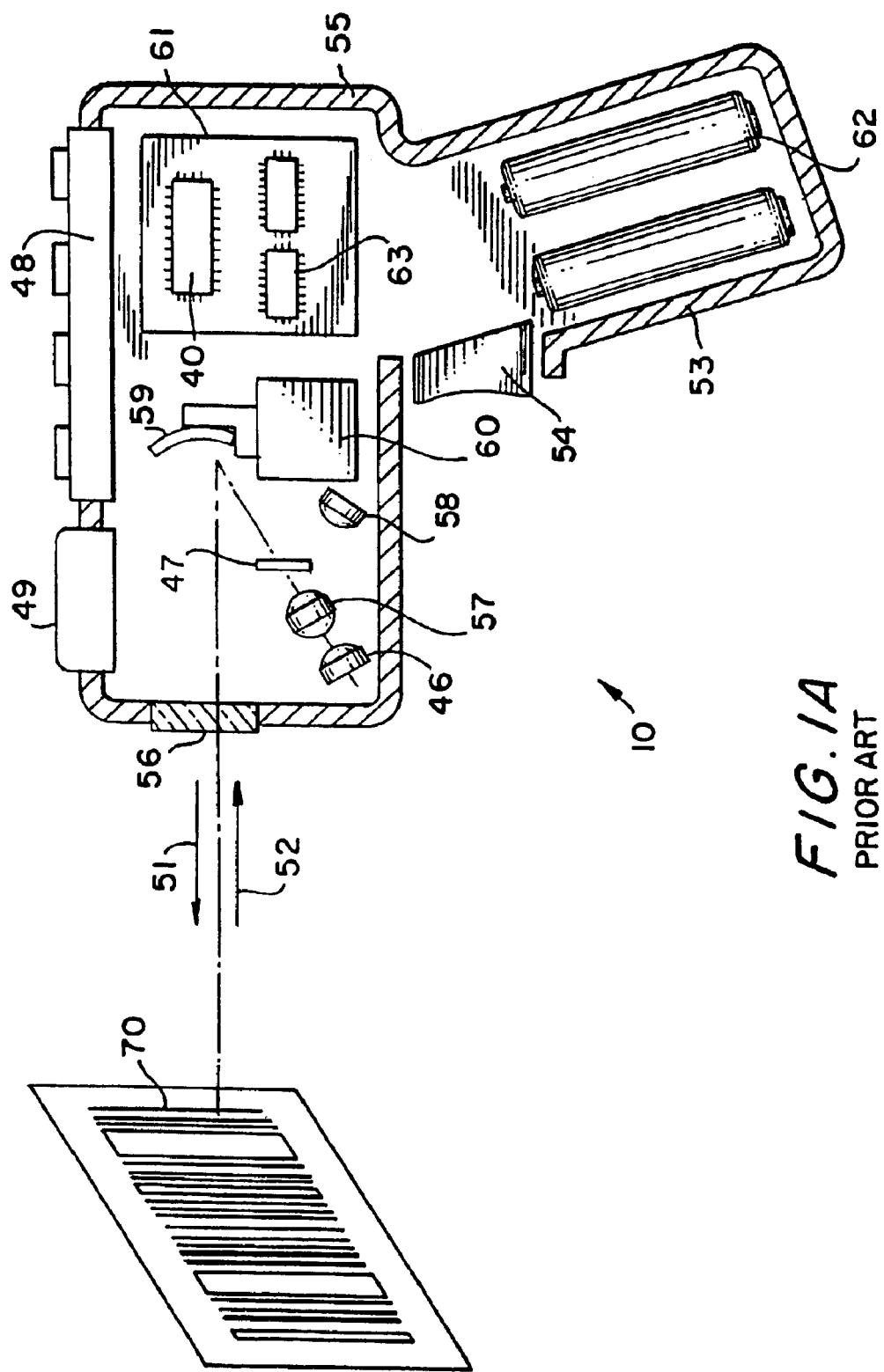
FIG. 1A is a schematic view of a prior art hand-held laser scanner and data collection terminal.

FIG. 1A illustrates an example of a prior art bar code symbol reader 10 implemented as a gun shaped device, having a pistol-grip type of handle 53. A lightweight plastic housing 55 contains a light source 46, a detector 58, optics 57, signal processing circuitry 63, a programmed microprocessor 40, and a power source or battery 62. A light-transmissive window 56 at the front end of the housing 55 allows an outgoing light beam 51 to exit and an incoming reflected light 52 to enter. A user aims the reader 10 at a bar code symbol 70 from a position in which the reader 10 is spaced from the symbol, i.e., not touching the symbol or moving across the symbol.

As further depicted in FIG. 1A, the optics may include a suitable lens 57 (or multiple lens system) to focus the scanned beam into a scanning spot at an appropriate reference plane. The light source 46, such as a semiconductor laser diode, introduces a light beam into an optical axis of the lens 57, and the beam passes through a partially-silvered mirror 47 and other lenses or beam shaping structures as needed. The beam is reflected from an oscillating mirror 59 which is coupled to a scanning drive motor 60 energized when a trigger 54 is manually pulled. The oscillation of the mirror 59 causes the outgoing beam 51 to scan back and forth in a desired pattern.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. No. 4,387,297 and U.S. Pat. No. 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion.

The multi-mirror construction is repetitively reciprocally driven in alternate circumferential directions about a drive shaft on which the multi-mirror construction is mounted.

The light 52 reflected back by the symbol 70 passes back through the window 56 for transmission to the detector 58. In the exemplary reader 10 shown in FIG. 1A, the reflected light reflects off of mirror 59 and partially-silvered mirror 47 and impinges on the light sensitive detector 58. The detector 58 produces an analog signal proportional to the intensity of the reflected light 52.

The signal processing circuitry includes a digitizer 63 mounted on a printed circuit board 61. The digitizer processes the analog signal from detector 58 to produce a pulse signal where the widths and spacings between the pulses correspond to the widths of the bars and the spacings between the bars. The digitizer serves as an edge detector or wave shaper circuit, and a threshold value set by the digitizer determines what points of the analog signal represent bar edges. The pulse signal from the digitizer 63 is applied to a decoder, typically incorporated in the programmed microprocessor 40 which will also have associated program memory and random access data memory. The microprocessor decoder 40 first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard to which the scanned symbol conforms. This recognition of the standard is typically referred to as autodiscrimination.

To scan the symbol 70, the user aims the bar code reader 10 and operates movable trigger switch 54 to activate the light source 46, the scanning motor 60 and the signal processing circuitry. If the scanning light beam 51 is visible, the operator can see a scan pattern on the surface on which the symbol appears and adjust aiming of the reader 10 accordingly. If the light beam 51 produced by the source 46 is marginally visible, an aiming light may be included. The aiming light, if needed, produces a visible light spot which may be fixed, or scanned just like the laser beam 51. The user employs this visible light to aim the reader at the symbol before pulling the trigger.

The reader 10 may also function as a portable data collection terminal. If so, the reader 10 would include a keyboard 48 and a display 49, such as described in the previously noted U.S. Pat. No. 4,409,470.

Figure 1B:
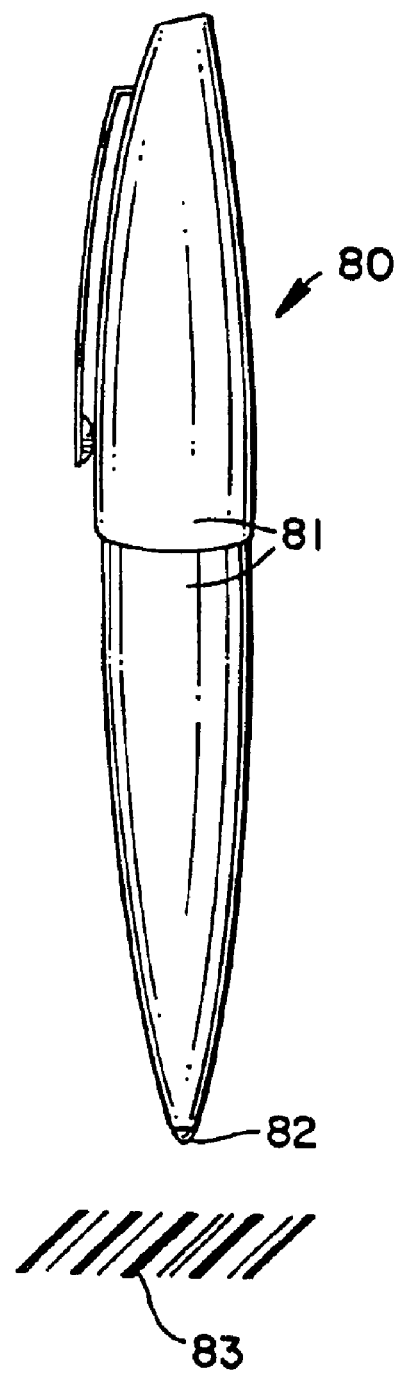
FIG. 1B shows a hand-held pen-type optical reader.

In view of the relative simplicity, availability and adaptability of information systems including bar code symbol data storage capability, it is desirable to develop systems particularly suitable for consumer applications. An optical reader which has many consumer applications is shown in FIG. 1B. The arrangement, generally designated as 80, comprises a pen-shaped main body 81 having at its writing end an optical scanner element light emitter and detector 82 for reading a bar code symbol illustrated schematically as 83. The pen may also include actual writing capability, for example by having the writing nib adjacent the optical element 82 or, indeed, having the writing element and the optical element 82 at opposing ends. It is desired to increase the range of applications for such a product. The data processing capabilities of such a system 80 are limited by its physical size and power supply potential consequently limiting the range of applications of the arrangement. In addition various problems arise in actual operation of such a system, in particular in regulating the varying speeds at which consumers scan given bar code symbol 83.

An embodiment of an optical reader to be used in conjunction with the present invention is shown in FIG. 2. Although a pen-type optical reader is shown, it will be appreciated that any other hand-held configuration would be appropriate for use in conjunction with the present invention. Although specific constructional details are also discussed in more detail below, it will be appreciated that data storage/processing elements and optical reader elements of known type can replace the specific components discussed in a manner that would be well known to the skilled person. A discussion of pen-type readers is found in U.S. Pat. No. 5,506,392, commonly assigned herewith and incorporated herein by reference.

The pen-type optical reader (henceforth referred to as a "pen reader") is generally referenced 90 in FIG. 2. It will be appreciated that the exact shape of the pen reader as illustrated may be exaggerated, for example in width, in order to show more clearly each of the principal components and how they interact. In the embodiment shown, the pen reader 90 comprises a ballpoint pen 91, 92 together with the optical reader 93 itself. The pen reader need not actually have writing capability, or may be in the form of any suitable writing implement such as a pencil, a fountain pen, a marker pen and so forth. Indeed the optical reader sub-system discussed in more detail below can be in a modular form insertable into a suitably configured writing implement housing of any desired type.

The writing element of the pen reader 90 is shown schematically as a ball-point pen cartridge 91 together with a projection/retraction mechanism generally designated 92 and of any suitable known type. Evidently it is desirable to reduce the size of those elements 91, 92 as far as possible to allow maximum space for the reader module.

The reader module is generally designated 93. The components and construction of the module 93 will be generally well known to the skilled person and are described only briefly hereafter for the purposes of completeness. The reader module 93 includes a light source 94, for example, a laser or LED and a reflector 95. A reading beam generated by the light source 94, is reflected by the reflector 95 out of a reading window 96. The reading beam is reflected by a bar code symbol generally designated as 97, passes once more through the reading window 96 and is received by a detector 98. The reader module 93 may be a field of view reader in which case the mirror 95 is a fixed mirror and the detector 98 comprises a CCD (charge coupled device) array, or a scanning system in which case reflector 95 is driven by a motor schematically shown at 99 for scanning motion. The light source 94, detector 95 and, if appropriate, motor 99 are connected to a processor, control and data storage element 100 in conjunction with a power source 101. The processor element 100 controls operation of the various components and also acts as a data storage and processing device for bar code information read by the module 93. As discussed in more detail below, it is desired to download the information stored in processor element 100 at a later stage to an external device. Accordingly a data output port is provided and is fed by line 102, preferably adjacent to or in conjunction with the reading window 96.

A particular implementation proposed according to the present invention for the pen reader 90 occurs in relation to consumer information access. For example where a consumer carries a pen reader 90 and is reading a printed publication including advertisements, the text of the advertisements may not contain sufficient information concerning the product advertised, nor, of course can the advertisements act as any more than encouragement for the consumer to purchase the product should the consumer subsequently encounter the product, introducing the risk that the consumer may forget about the product.

Figure 3:
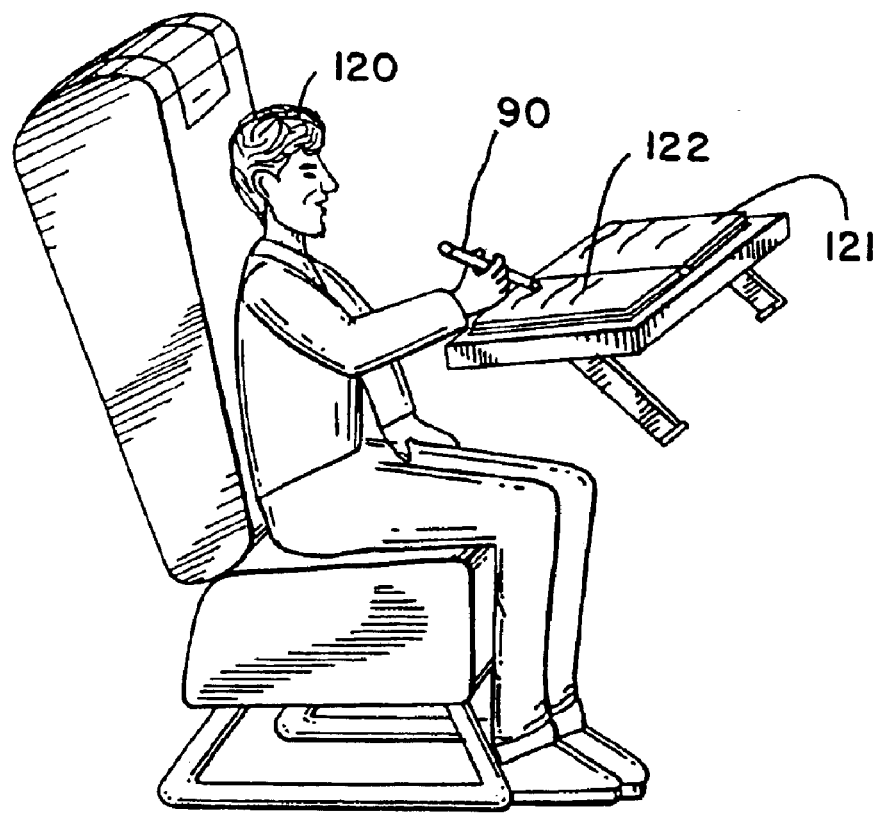
FIG. 3 demonstrates use of the pen-type optical reader.

Where, as in FIG. 3, the advertisement carries a bar code symbol 122, however, many of these problems can be rectified for a consumer 120 carrying a pen reader 90 of the type shown in FIG. 2. When an advertisement for example in a magazine 121 is of interest to the consumer 120, the consumer simply scans the corresponding bar code symbol 122 with the reader pen 90. The bar code information is stored in the processing element 100 and, to the extent desired, processed. In particular, information contained in the bar code symbol 122 relating to the advertised product is stored. As a result the consumer has an automatic reminder of the product he wishes to purchase as well as information relating to the product. Evidently, where the consumer 120 sees more than one product of interest, the relevant information can also be stored, the storage capabilities of the reader pen 90 being limited only by the storage space in the processor element 100.

A particular implementation of the present invention allows the consumer to subsequently download the information stored in the reader pen 90 in a manner described in more detail below. In particular the information can be downloaded to a personal computer or other access point to a computer or data network. The downloaded information can then be used in various different manners. For example the product can be ordered or additional information concerning the product can be accessed. A particular implementation proposed under the present invention is that the bar code symbol accompanying the advertisement contains sufficient information for the personal computer or access point to the computer network to access a site on the Internet (or comparable data storage system). This site can contain additional information concerning the advertised product, information concerning related products, price information, cross-references to further related sites, and the capability of ordering and paying for the product. This greatly simplifies the purchasing process and also ensures that the consumer does not forget a product which has caught his attention.

In addition, further information can be derived according to the present invention. For example the impact of the advertisement and popularity of the product can be assessed for future marketing purposes, and quantifying the amount of printing space that should be assigned to the advertisement based on its popularity. Preferably the reader pen 90 has a dedicated user and carries user identification information such as a credit card number, or other identification carried under an approved system. As a result, during purchase of the product, details of the transaction can be based on that information. In addition a customer profile can be built up based on the consumer's buying patterns.

It will be seen that the system can be extended to other applications. For example where an abstract of text is printed together with a bar code symbol, the bar code symbol can contain information which, when downloaded, can provide access to additional or related text.

Assuming high enough resolution, the bar code symbol can even be read off a VDU or other visual display system in a closed system in order to access additional information on the Internet.

Where the bar code symbol is for use in conjunction with the Internet or parallel system, the information contained in the bar code symbol effectively comprises an Internet address. When that information is downloaded to a personal computer, the personal computer communicates with a dedicated server which captures the Internet address and user identification information and re-routes to the advertiser's web site for information retrieval and delivery to the consumer's personal computer. Accordingly, the downloaded information would enable the consumer to go directly to a relevant home page or a relevant sub-page. A resolution server on the system could be used to collect information from all users, not only for information purposes but also for billing and routing purposes.

Various alternative pen reader configurations are shown in FIGS. 4 to 6. Referring firstly to FIGS. 4A and 4B, a reader pen 130 includes a pen assembly 132 including a ball pen cartridge, for example, of the type sold under the trade mark Zebra F-refill and an actuating mechanism 134 of a known type rotatable to extend and retract the ball pen cartridge. The pen reader 130 further includes a trigger 136 manually actuable to enable a scan together with a cooperating internal switch 138 example, code ITT KSC 421. The reader pen 130 includes a wand tip 140 for reading a bar code symbol. A data output port is also provided at 137. The system is powered by a battery 142 of any suitable compact type. Also included is a beeper 144 or other audible device which can sound to indicate to the user that a bar code symbol has been successfully read, that the battery power is low, that there is little memory space left and so forth. Different audible tones or sequences of audible tones can represent different warning signals. In addition the pen reader 130 can include a screen (not shown) carrying information as to the status of the pen reader and any instructions for use thereof.

FIGS. 5A to 5E show a slight variant in which, where appropriate, the same reference numerals have been used as for FIG. 4. It will be seen that the exit window for the reader (here shown as a laser scanner at 131) is in an inclined face relative to the longitudinal axis of the reader pen 130, allowing improved ergonomics in reading a bar code symbol. The reader further includes a grip 133, for example made of leather, around a portion of its length allowing improved user grip and comfort.

Figure 6A:
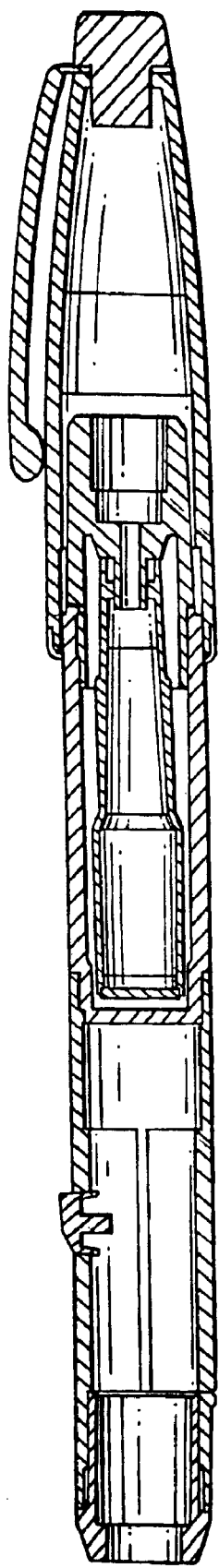
FIG. 6A is a sectional view of an alternative pen-type optical reader.
Figure 6B:
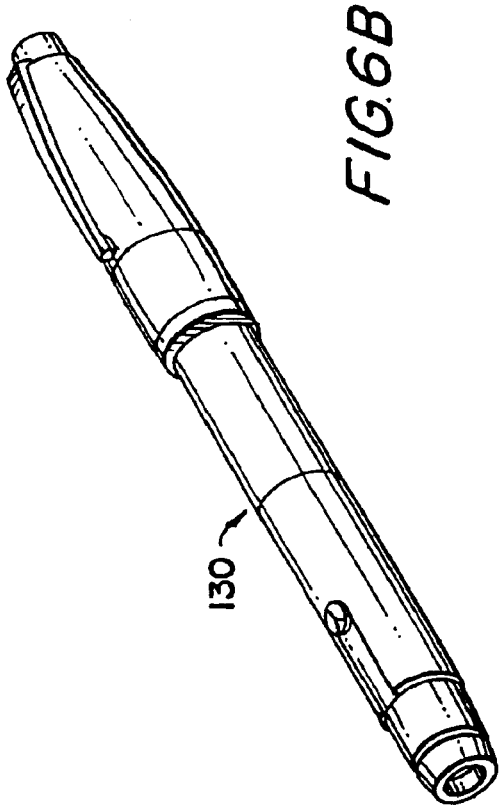
FIG. 6B is a perspective view of the pen-type optical reader of FIG. 6A.

FIGS. 6A and 6B show a further alternative configuration schematically once again using the same reference numerals where appropriate as in FIGS. 4 and 5.

Figure 7A:
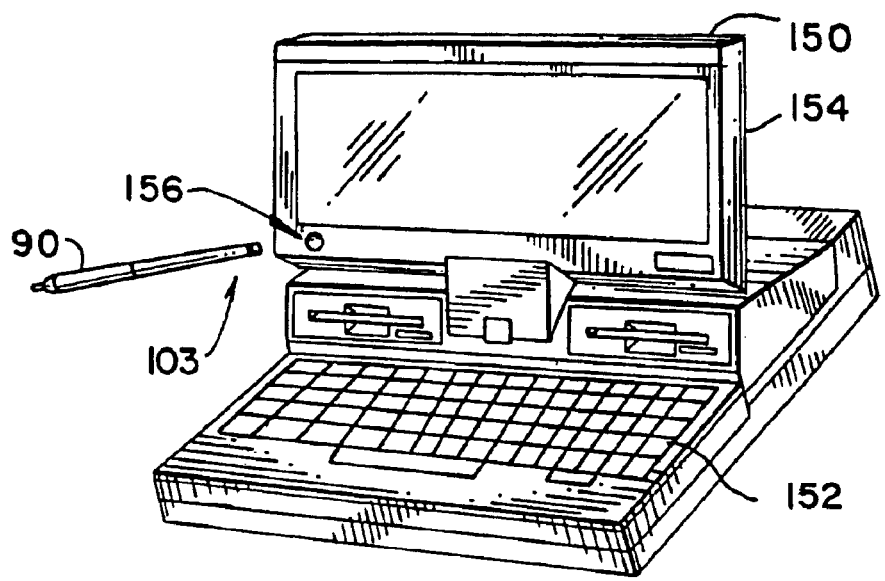
FIG. 7A shows one method of downloading information from a pen-type optical reader according to the present invention.
Figure 7B:
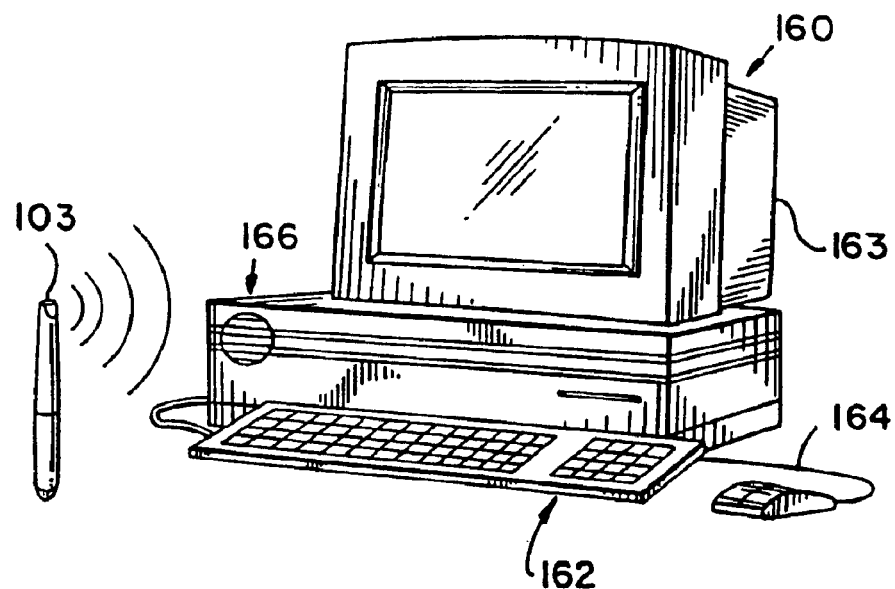
FIG. 7B shown an alternative method of downloading information from the pen-type optical reader according to the present invention.

Various methods of downloading the information are contemplated. Two approaches are shown in FIGS. 7A and 7B. In a preferred configuration shown in FIG. 7A, a personal computer is shown at 150 being of the portable type although a fixed type computer will also, of course, suffice. The personal computer 150 includes a keyboard 152 and a screen 154 and can generally be of conventional type. The personal computer 150 includes a data input port 156 arranged to communicate with the pen reader data output port 103. In the embodiment shown, the output port 103 of the pen reader 90 is touched against the data input port 156 on the personal computer 150. Touching the input port 156 firstly commences the downloading sequence and secondly allows accurate and rapid communication between the pen reader 90 and the personal computer 150. The interface between the pen reader data output port 103 and the data input port 156 can, for example, be of the "memory button" or "touch memory" type, for example, as sold by Dallas Semiconductors. The actual interface is of well known type and, in effect, the information stored in the pen reader 90 is communicated to the port 103 provided at an appropriate point on the pen reader 90. The information is converted to a suitable form for transmission at the port 103 and, on contact with the data input port 156 of the personal computer 150, the transmission is activated. The data input port 156 is configured to receive and convert into a suitable form information transferred from the port 103. In particular the information can be transferred in the form of a series of electronic pulses representing bits. Such a system gives rise to a simple and substantially error-free interface allowing a user to download information stored in a reader pen 90 to a personal computer 150 quickly and accurately.

As will be appreciated, various other downloading methods are contemplated within the ambit of the present invention. For example as shown in FIG. 7B, a fixed-type personal computer 160 including a keyboard 162, a display screen 163 and a mouse 164 includes a microphone 166 which receives an audio signal from a corresponding speaker data output 168 on a reader pen 90. A button (not shown) or other switch can be included on the reader pen 90 to activate transmission by the speaker 168. The information stored in the reader pen 90 is converted to a high frequency audio signal at the speaker 168 which is received by the microphone 166 and decoded. Of course, the transmitter can transmit other forms of radiation, for example, it can be an optical or microwave transmitter with a suitable receiver being provided on the personal computer.

Figure 8:
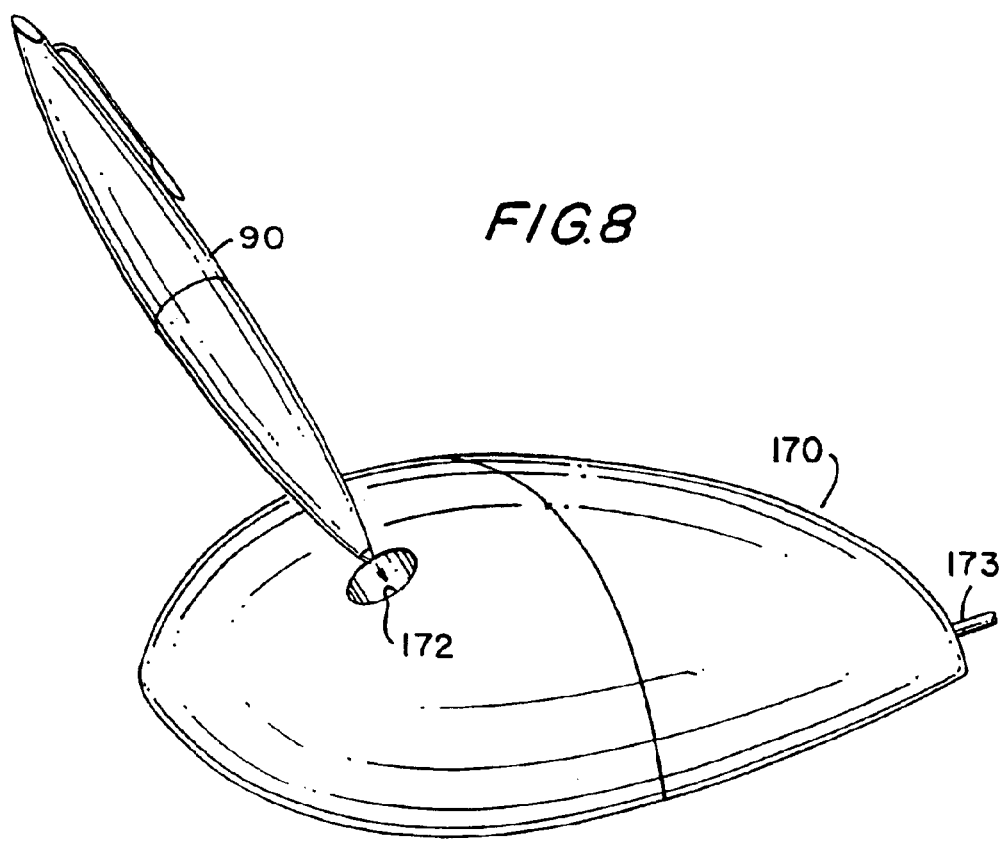
FIG. 8 shows a dedicated downloading port from the pen-type optical reader according to the present invention.

Yet a further downloading system is shown in FIG. 8. A dedicated data downloading port 170 includes an orifice 172 for receiving a reader pen 90. The port 170 communicates information downloaded from the pen reader 90 via a line 174. Referring to the sectional view shown in FIG. 9, it will be seen that the port 170 includes a data receiving interface 174 of any of the types described above which communicates with the reader pen 90 for downloading of information. Downloading can be contact activated by contact between the pen reader 90 and the interface 174, or activated by pushing a button or other switch (not shown) on the pen reader. The interface 174 communicates with a processor 176 for converting the downloaded information, if necessary, into a format appropriate for a computer network, and the information is communicated to the computer network via line 173.

Figure 9:
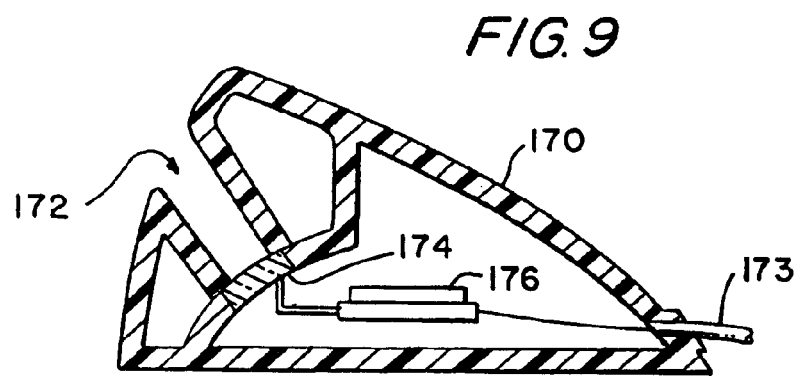
FIG. 9 is a sectional view of the downloading port shown in FIG. 8.

It will be seen that all of these methods comprise a user-friendly system for downloading scanned information from a pen reader. Use of a port of the type shown in FIGS. 8 and 9 is particularly suitable where it is not desired to rely on the consumer having a computer or other home access to a suitable computer network. The port can, for example, be provided at a retail outlet or other point of sale. It should be noted that the pen reader can also be writable via the data port, personal computer or other means (even a bar code symbol itself) to input user information of the type discussed above. This would facilitate short term usage of a pen reader allowing a given user to input information temporarily for the duration of his or her use of the pen reader.

The range of applications of the system as a whole is evidently very wide. For example, a consumer could use the pen reader while on an airplane or in other areas where access to the Internet was not immediately available. In addition to advertisements and editorial text of the type described above, the system could be used to store and access information concerning items in many other applications, for example in warehouse storage systems.

It will be seen that the above teachings relate to any scanner type suitable for hand-held scanning and being essentially portable, capable of reading a bar code symbol or similar information carrying symbol. The information can be downloaded from memory in the hand-held scanner by means of any suitable interface to a personal computer or other access point or computer network, and corresponding information called up from an Internet web site or corresponding main memory location.

Although the invention has been discussed with reference to certain housings, triggering or mode-switching mechanisms and other features of the disclosed embodiments, it will be understood that a variety of housing styles and shapes and triggering mechanisms could be used. Other conventional features of bar code reading systems can also be included if so desired. The invention is preferably implemented using miniaturized components such as those described herein or in the materials referenced herein, or otherwise known in the art.

Additionally, even though the present invention has been described with respect to reading one dimensional bar codes, it is not limited to such embodiments, but may also be applicable to more complex indicia scanning or data acquisition applications such as two dimensional bar codes and matrix array symbols comprised of geometric shapes. It is conceivable that the present invention may also find application for use with various machine vision or optical character recognition applications in which information is derived from indicia such as printed characters or symbols, or from the surface or configurational characteristics of the article being scanned.

In addition to being packaged in specific housings, the elements of the scanner may be implemented in a very compact assembly or OEM subassembly such as a single integral module or "scan engine". Such a module can interchangeably be used as the dedicated pointer/scanning element for a variety of different writing instruments, housings, operating modalities and types of data acquisition systems.

The module could advantageously comprise various optic subassemblies mounted on a support, and photodetection components, such as a photodiode, charge coupled or solid state imaging device. Control or data lines associated with such components may be connected to an electrical connector mounted to enable the module to be electrically connected to a mating connector associated with other elements of the data acquisitions system.

An individual module may have specific scanning or decoding characteristics associated with it, e.g., operability at a certain working distance, or operability with one or more specific symbologies or printing densities. The characteristics may also be defined through the manual setting or factory setting of control parameters associated with the module. The user may also adapt the data acquisition system to scan different types of articles or operate at different ranges, or the system may be adapted for different applications by interchanging modules in the data acquisition system through the use of a simple electrical connector.

The scanning module described above may also be implemented within a self-contained data acquisition unit or portable computer including one or more such components as keyboard, display, printer, data storage, application software, and databases. Such a unit may also include a communications interface to permit the data acquisition unit to communicate with a host computer, or other components of a data processing system, or with remote computers through a local or wide area network or with the telephone exchange network, either through a modem, XDSL interface or an ISDN interface, or by low power radio broadcast from a portable terminal to a stationary or mobile receiver and thereafter to other system components.

Although we refer to the optical reader 90 as a "pen reader" for convenience, it is to be understood that the reader may be operable either as a fixed beam "wand" type reader, in which the symbol is scanned by manual motion of the reader by the user to move the beam spot across the symbol, or a moving beam scanner in the reader itself in which a motor drive moves a mirror (or other optical element or assembly, including possibly the light emitter) to create a moving beam. The optical reader of the present invention may also be embodied in different housings other than "pen" shaped housings.

Another embodiment of the present invention provides the capability of optionally utilizing the pen reader 90 as a light pointer, using the beam emitted from the light source 94 (which for reasons of visibility would typically be a semiconductor laser). Such laser pointers are useful for highlighting features in a slide presentation, allowing the lecturer to stand at some distance away from the screen. In such an application of the pen reader, the reflector 95 may or may not be activated, depending on whether one wanted a stationary spot pointer, or a pointer which projected the image of a line or circle on the target. The description of the operation of a convertible pointer/bar code reader (in a housing without the writing instrument) is described in greater detail in U.S. patent application Ser. No. 08/936,288, which is hereby incorporated by reference.

A manually operated multi-position trigger switch (such as the clip C, in FIG. 2 or a slide switch as shown in the embodiment of FIG. 4) may be used to switch between the various modes of operation of the pen reader. In a first position of the switch, the laser diode 94 is switched off, and no beam is produced. In a second position, the laser diode is switched on and is reflected from the stationary mirror 95, thereby providing a fixed pointing beam. In a third position of the switch, the scanning mirror 95 is actuated, causing the beam to be scanned, thereby generating a visible line on the surface that is being pointed to. In the preferred embodiment, the scanning is in one dimension so that the resultant line on the screen is straight. In an alternative embodiment, however, the scanning mirror 95 could cause the beam to be scanned in two orthogonal directions, thereby forming any desired pattern, such as a Lissajous pattern or a circle, on the screen. More complex scanning arrangements could also be envisaged, with the laser being turned on or off at predetermined intervals in conjunction with a predetermined scan path in a plane being implemented so that a predetermined image or curvilinear figure can be projected onto the screen such as a square or triangle, or a pattern of dots forming any other desired figure.

One of the differences between operating in a bar code reading mode and a pointing mode is that the target is located at, and the beam spot is focused at, a distance of a few inches in a reading mode, and at ten or twenty feet in a pointing mode. The laser diode itself will normally be packaged with a focusing lens that focuses the beam spot for bar code reading at a relatively short predetermined working range from the end of the reader. In order to implement a dual distance, and dual mode device, an additional lens L1 may be provided which is disposed within the housing and moved into the optical axis of the first focusing lens when the pointing mode is activated. Thus, in the pointing mode, the beam will pass through two lenses and will focus at a substantial distance away from the end of the pointer. Lenses L1 may be mechanically moved in and out of the beam path by direct action of the switch being manually moved by the user between reading and pointing modes of operation.

For example, pushing the clip C in an inward direction may move the lens L1 along a track and click into a predetermined fixed position in the path of the outgoing laser beam. The track can be spring loaded, so that another movement of the clip C will release it out of the beam path.

Alternatively, lenses L1 may be fixed in position in the housing, and the beam path moved into either L1 or a clear path to the window. In that alternative, the beam path may be moved by the mirror, or by changing the position of the source.

If the trigger is a multi-position trigger, the positions of the trigger could be programmed so that different contacts correspond to different projected images. Thus, the pen could provide an image of a straight line when the trigger is set in a first position and a projected circle when the trigger is set in another position. Different positions of the trigger could also provide different lengths of line and/or different sizes of circle or other images that are being projected.

Scanning of the beam, of course, reduces the visibility of the image with respect to the visibility of the spot generated by a fixed beam. To compensate, the laser output power may be increased depending upon the position of the trigger or the mode of use.

The convertible laser pointer/scanner of this embodiment may also be embodied in a stylus for a pen computer, such as shown in U.S. Pat. No. 5,369,262, herein incorporated by reference. Such stylus can be used with active matrix or passive (pressure sensitive) display terminals. The laser pointer may also be embodied in a writing instrument, such as a pen or mechanical pencil, such as depicted in U.S. patent application Ser. No. 08/794,782, herein incorporated by reference.

In addition to the above noted features, it is possible to incorporate other features into the pen, including making it a miniature portable computer with a small (e.g., 1-line) LCD display, and a small number of input buttons for entry of data or control operations, or a trackball for scrolling. A voice recorder can also be implemented for taking dictation or reminder messages. A radio receiver may also be incorporated with the same housing so the unit may function as a pager with a small, one-line display.

Voice recognition or motion detection may be used to initiate operation of any predetermined computer function. To the extent a more sophisticated motion detection system could be implemented in the pen, handwriting recognition, signature verification or authorization, and similar functions could be implemented. The motion of the pen in space could also be captured in memory and translated into equivalent text so that the pen does not have to actually write on paper in order for the data "written" by the motion of the pen to be recorded.

Alternatively, the laser pointer may also be embodied within the housing of a portable, hand-held data terminal or computer (sometimes called a "portable digital assistant") such as depicted in U.S. patent application Ser. No. 09/047, 015.

Rather than switching between a pointing and a reading mode, the manually operated multi-position trigger switch may be used during the reading mode to move one of the components, for example, the lens L1, between a first position in which the light beam is focused at a first focus within a first working distance relative to the window 96, and a second position in which the light beam is focused at a second focus within a second working distance relative to the window 96. One of the foci may be located inside the housing, or at the window, or at a close-in distance near the window in order to read close-in indicia located in the first working distance at a range of several inches away from the window. The other of the foci may be located at a far-out distance away from the window in order to read far-out indicia located in the second working distance at a range of several feet away from the window.

Thus, the instrument can read close-in and far-out indicia by moving the movable component which, as previously mentioned, can be jointly moved by sliding a button on a slide switch mounted on the housing, or can be moved by a drive that is electrically energized by manually pressing a button on a switch.

FIG. 10 schematically depicts a pushbutton switch 200 which, when depressed, causes an electromagnetic coil 202 to generate an electromagnetic field that interacts with a permanent magnetic field of a permanent magnet 204. The focusing lens L1 is mounted for joint movement with the magnet 204. The magnet is cantilever mounted on a flexure 206, such as a leaf spring, having its end opposite the magnet anchored and fixed in position. The interaction of the fields causes the flexure 206 to oscillate and, in turn, moves the lens in and out of the optical path, thereby focusing the light beam traveling along this optical path to be focused at the first or the second focus to selectively read indicia located at one of the foci.

In accordance with this invention, rather than incorporating a writing implement in the portable housing, the electro-optical assembly in the instrument includes not only a bar code scanner as described above, but also an image projector for projecting a bit-mapped image, such as an alphabetic word 210 depicted in FIG. 11. The projector may include its own subassembly of components separate from the scanner components, but preferably, at least some of the components are shared and are selected to perform its function by a mode selector switch 212 mounted for sliding movement on a pen-shaped housing 214 for movement between a pair of switched states corresponding to a pair of reading and display modes, respectively.

Figure 12:
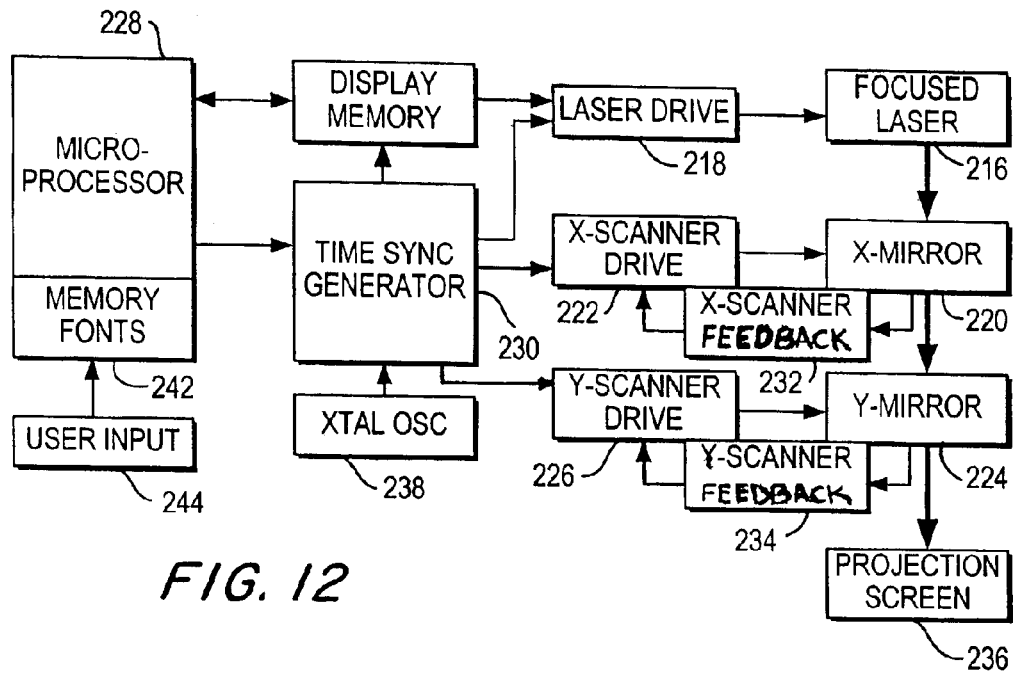
FIG. 12 is a block diagram of an electro-optical assembly on the instrument of FIG. 11.

As more specifically depicted in FIG. 12, a light source such as a laser 216 energized by a drive 218 emits a laser beam to a first x-mirror 220 oscillatable by an x-drive 222 for horizontally moving the laser beam back and forth at a first sweep frequency $f_h$ along a first direction, commonly termed "X-axis" sweeping, and, in turn, to a second y-mirror 224 oscillatable by a y-drive 224 for vertically moving the laser beam up and down at a second sweep frequency $f_v$ along a second direction, commonly termed "Y-axis" sweeping. The first and second directions are mutually orthogonal. The first or horizontal sweep frequency is generally much faster than the second or vertical sweep frequency. In the preferred embodiment, $f_v$=60 Hz and $f_h$=3.8 kHz. A control processor 228 is operative for controlling a time synchronizing generator 230 which, in turn, controls the x-drive 222 and the y-drive 226 to insure that the x-mirror 220 and the y-mirror 224 oscillate at the correct speeds. An x-scanner feedback circuit 232 and a y-scanner feedback circuit 234 monitor the sweep frequencies of the mirrors 220, 224 and assist the drives 222, 226 in maintaining the rated speeds. A crystal oscillator 238 serves as the master clock.

The resulting light pattern known as a "raster" is identified in FIG. 11 by the reference numeral 240. Starting at point A, a spot of focused light from the laser 216 is swept by the drive 222 at the horizontal frequency along the X-direction to the point B to form a first scan line. Thereupon, the drive 226 sweeps the spot from the point B at the vertical frequency along the Y-direction to form a second scan line. The formation of successive scan lines proceeds in the same manner. In a preferred embodiment, for a display area or a projection screen 236 measuring on the order of 4 square inches (e.g., 2.25 inches×1.75 inches) at a distance of about 15 inches from the instrument, the resolution of the raster is about 120 lines or pixels along the height (Y-direction) and about 64 pixels along the width (X-direction).

The image 210 is created in the raster pattern 240 by pulsing the laser 216 on and off at selected times under the control of the processor 228 and the generator 230 which, in turn, control the laser drive 218. The laser 216 produces visible light and is turned on only when a pixel in the desired image is desired to be seen. For example, the letter "L" in the image word "SYMBOL" in FIG. 11 is formed by turning the laser on at pixel D in a scan line, and again at pixel E in another scan line, and so on until the vertical leg of the letter "L" is formed. The horizontal leg of the letter "L" is formed by turning the laser on at successive pixels F, G, H, along the same scan line.

Every letter or number can be formed by this technique. Indeed, any image, including graphical designs and logos, and even bar code symbols, can be formed from a plurality of such bits arranged along the X-and Y-axes. Fonts can be stored in a font file in memory 242 for access by the processor 228.

Returning to FIG. 12, the same laser 216 can be used in the reading mode for reading symbols, and in the display mode for projecting the beam spots. The mirror 220 is shared in both modes, and the mirror 224 is shared only when two axis reading is desired. The manual selection by the switch 212 is depicted in FIG. 12 by the user input box 244.

The assembly can fit in a volume of about 12 mm in diameter by about 12 mm in length and, hence, can fit in a housing configured as a pen, a ring, a key chain, a pendant, or any other device having a small form factor. As mentioned above, the liquid crystal display (LCD) is a component that limits size reduction in many devices. An LCD has a useful viewing angle limited to about 30 degrees and typically artificial light is required to provide adequate brightness to read the display. Hence, the LCD is not useful in highly miniaturized applications with which this application is concerned and, as a result, the image 210 need not be projected at a distance from the housing 214 as depicted in FIG. 11, but can be projected onto the projection screen 236 located on and built into an exterior wall of the housing itself, or, as will be explained below in connection with FIG. 15, can be located on a nearby surface adjacent the housing and, in some applications, can even be projected onto the user's palm which serves as a convenient projection screen.

The image area is roughly 4 to 8 square inches to achieve a contrast ratio of around 4:1 to enable easy viewing. A larger image area would require the laser power to exceed CDRH-II safety levels if the display brightness and contrast ratio are to be maintained. Conversely, the brightness and contrast ratio are reduced for an increased display area if the laser power is kept constant.

The display area can be changed dynamically by changing the scan angles of the mirrors 220, 224, or by varying the operating power or the scan speed. The image height is scanned at a minimum of 40 Hz to reduce flicker. The x-mirror 220 is preferably a flat mirror mounted on a torsional band. The center of rotation of the mirror is symmetrical to the rotating axis to minimize audible noise.

The laser power is preferably varied with the scan speed to maintain a display of uniform visibility. The product of laser power and pixel duration should remain a constant throughout the display. The on-off duration of each spot during a scan line can be varied so that the line resolution can be considered infinite.

A mask can be included in the housing to block the scan lines at the top and bottom of the raster pattern 240 to reduce distortion due to scan speed variation. The mode selector need not be a slide switch 212, but can be any user actuated switch or button, and even voice activation can be used.

As described so far, the instrument has a reading mode in which it can read one- or two-dimensional symbols, and a display mode in which it can project a bit-mapped image on a screen or analogous viewing surface. If the symbol is a URL address, the instrument can be made Web capable to provide Internet browsing via a wireless link. Information from a website can be downloaded into the instrument and displayed by the image projector.

Figure 13:
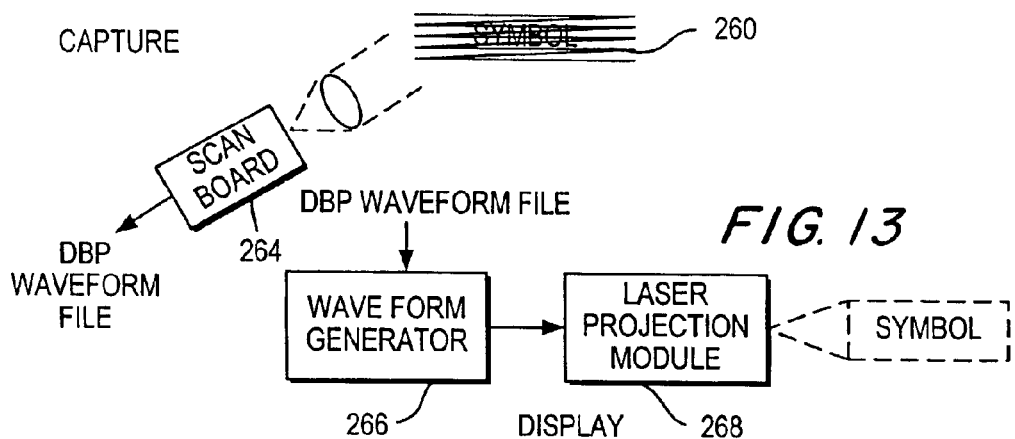
FIG. 13 is a block diagram depicting the operation of the assembly of FIG. 12.
Figure 14:
FIG. 14 is a diagram of the operation of the assembly of FIG. 12 during capture of a signature.

The instrument can be used in reverse as a camera or capture device to capture an object image, such as the word "SYMBOL" 260 in FIG. 13, or to capture a handwritten signature 262 in FIG. 14, in a capture mode. The field of view can be changed dynamically by varying the scan angles of the mirrors 220, 224. The resolution can be varied by dynamically changing the scan speed. The image 260 in FIG. 13 can be captured by a scan board 264 on which the electro-optical assembly is mounted to generate a DBP waveform file which, in turn, is conducted to a waveform generator 266 and the image projector 268 to generate the display. To reduce noise during signal capture, the laser light during each horizontal scan line can be pulsed to sample the image.

In the case of a pen-shaped instrument, accelerometers can be integrated therein, for sensing the motion of the pen as the user writes. The accelerometers also sense hand-jitter and correct the hand-jitter. By sensing the movement of the user's hand, the signals from the accelerometers can be used to dynamically change the size of the display or to zoom-in on a particular area of the display. For example, moving the pen terminal closer to the projection screen will enable a zoom-in display.

The accelerometers can also sense the movement of the hand and pan the display. Hence, it can be used as a scroll bar. For example, moving the pen sideways will pan the display left and right, and moving the pen up and down will scroll the display up and down. Of course, the display can be scrolled or panned by voice, trackball or "touchscreen" input.

Figure 15:
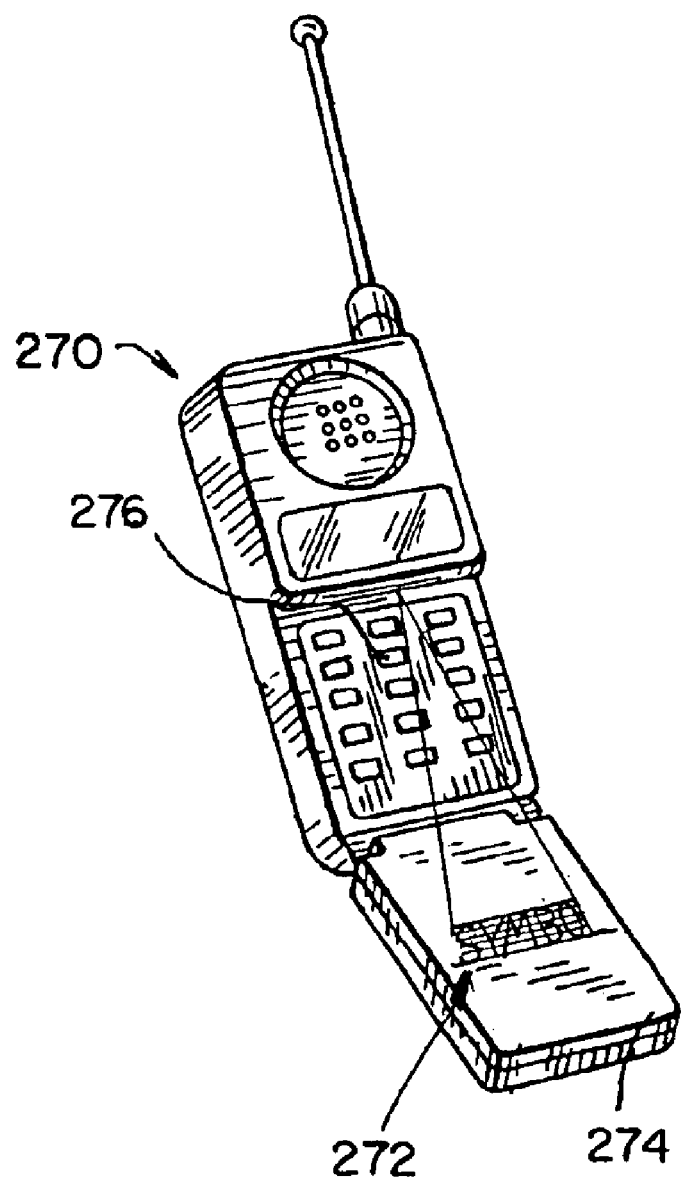
FIG. 15 is a perspective view of a telephone with a projected display image.

The laser projection display of this invention is superior to a conventional LCD display because the projection display has a view angle of ±90°, only consumes power on demand, and can generate an image larger than the instrument itself. As shown in FIG. 15 for the application of a cellular telephone 270, the projection display 272 can be projected on the exterior surface of a cover 274 used to overlie and protect the keypad 276 when the phone is not in use.

In other applications, the miniature size of the electro-optical assembly can be mounted on the side of a user's head, for example, in an eyeglass frame, for projecting an image on an eyeglass lens in the user's field of vision.

Figure 16:
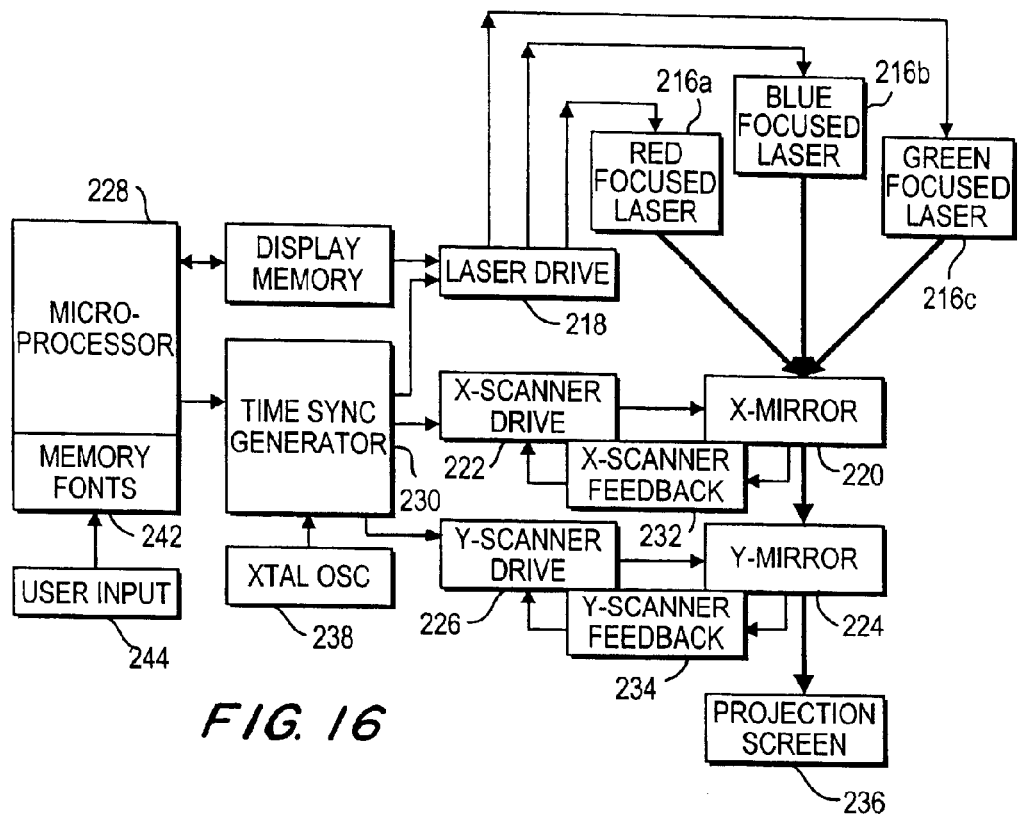
FIG. 16 is a view analogous to FIG. 12 for displaying a colored image.

FIG. 16 is analogous to FIG. 12, and like reference numerals have been employed to identify like parts. The major difference is that three lasers 216a, b, c are focused on the mirror 220, rather than the aforementioned single laser 216. These three lasers produce laser beams of different colors, e.g., red, blue and green, respectively, by using lasers of different frequencies, or by interposing colored filters in the path of the lasers. The light spots formed by each laser are superimposed on one another at mirror 220.

If only one of the lasers is actuated, then the spot on the mirror 220 will have the color of the actuated laser. If more than one laser is actuated simultaneously, then the spot on the mirror 220 will have the mixed color of all the actuated lasers. The use of red, blue and green lasers enables any color in the spectrum to be formed.

As before, the spot of the desired color is swept in mutually orthogonal directions by the drivers 222, 226. The laser drive 218 is connected to each laser and pulses them on and off to form a bit-mapped image. This image is colored in dependence upon which laser(s) has/have been actuated for each pixel of the image. Hence, the entire image can be colored all red, blue, or green, or any mixture of these colors. In addition, each pixel can be separately provided with a desired color so that the entire image comprises multiple colors.

Figure 17:
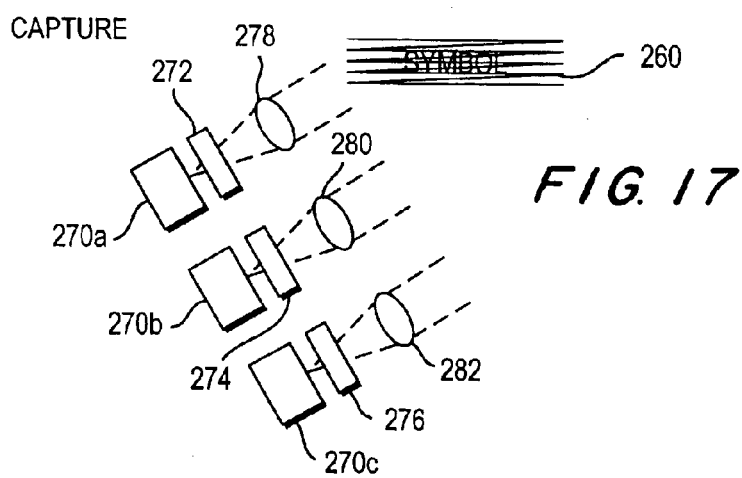
FIG. 17 is a view analogous to FIG. 13 for capturing a colored image.

FIG. 17 is analogous to FIG. 13, and shows the capture of a colored indicia 260 by employing a plurality, for example, three, of photodetectors 270a, b, c looking at the indicia through differently colored filters 272, 274 276, for example, red, green and blue filters, respectively. Focusing lenses 278, 280, 282 focus the image on the respective photodetectors.

It will be understood that each of the elements described above, or two or more together, also may find a useful application in other types of constructions differing from the types described above.

While the invention has been illustrated and described as embodied in a portable instrument for electro-optically reading indicia and for projecting a bit-mapped color image, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A portable instrument for projecting a bit-mapped two-dimensional image in a display mode of operation, and for selectively electro-optically reading indicia in a reading mode of operation, comprising:

a) a housing;

b) an electro-optical assembly supported by the housing, for reading the indicia during the reading mode, and for projecting the bit-mapped two-dimensional image on a viewing surface remote from the indicia during the display mode, the assembly including a light source for generating a light beam and a scanner for sweeping the light beam in a raster pattern of light paths that cover an area of the viewing surface during the display mode, and a controller for pulsing the light source on for causing pixels at selected positions of the beam in the light paths to be illuminated during the display mode, and for pulsing the light source off for causing pixels at other selected positions of the beam in the light paths to not be illuminated during the display mode, the image being comprised of a light pattern of illuminated and non-illuminated pixels on the area of the viewing surface; and c) a mode selector for selecting one of the modes.

2. The instrument of claim 1, wherein the housing has a size and a shape configured to be held in a user's hand during both the display and reading modes.

3. The instrument of claim 1, wherein the assembly includes a reader having a light source for generating a light beam, a light sensor having a field of view and operative for detecting light from the indicia during the reading mode, and wherein the scanner is operative for scanning at least one of the light beam and the field of view during the reading mode.

4. The instrument of claim 3, wherein the indicia is a coded, machine-readable symbol over which said at least one of the light beam and the field of view is scanned, and wherein the sensor is operative for generating an electrical signal corresponding to the symbol, and wherein the reader includes a signal processor for processing the signal to data indicative of the symbol.

5. The instrument of claim 3, wherein the indicia is a human-readable, two-dimensional representation over which said at least one of the light beam and the field of view is scanned, and wherein the sensor is operative for generating an electrical signal corresponding to the representation, and wherein the reader includes a signal processor for processing the signal to data indicative of the representation.

6. The instrument of claim 1, wherein the assembly includes a plurality of light source for generating a plurality of light beams, and wherein the scanner is operative for sweeping the light beams in the raster of light paths that cover the area of the viewing surface, and wherein the controller is operative for pulsing the light source on and off while the light beams are swept over each of the light paths.

7. The instrument of claim 6, wherein the scanner includes a first scan mirror for sweeping the light beams along a first direction, and a second scan mirror for sweeping the light beams along a second direction generally orthogonal to the first direction.

8. The instrument of claim 6, wherein the housing includes a window through which the light beams and the bit-mapped image pass.

9. The instrument of claim 6, wherein the light sources are lasers for generating the light beams as visible laser beams of different colors.

10. The instrument of claim 6, wherein the controller projects the image as alphanumeric characters.

11. The instrument of claim 1, wherein the mode selector is a switch on the housing, and actuable between reading and display states that respectively correspond to the reading and display modes.

12. The instrument of claim 1, wherein the housing is elongated and extends along an axis between opposite end regions, and wherein a window is located at one of the end regions, and wherein the bit-mapped two-dimensional image is projected through the window.

* * * * *